(12) United States Patent
Komatsu

(10) Patent No.: US 12,473,868 B2
(45) Date of Patent: Nov. 18, 2025

(54) VEHICLE

(71) Applicant: TOYOTA JIDOSHA KABUSHIKI KAISHA, Toyota (JP)

(72) Inventor: Takehiro Komatsu, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 190 days.

(21) Appl. No.: 18/468,965

(22) Filed: Sep. 18, 2023

(65) Prior Publication Data
US 2024/0141846 A1 May 2, 2024

(30) Foreign Application Priority Data

Nov. 2, 2022 (JP) .................... 2022-176657

(51) Int. Cl.
| | |
|---|---|
| F02D 41/02 | (2006.01) |
| B60W 10/02 | (2006.01) |
| B60W 10/06 | (2006.01) |
| B60W 10/08 | (2006.01) |
| B60W 20/16 | (2016.01) |
| F01N 3/023 | (2006.01) |
| F02D 41/00 | (2006.01) |
| F02D 41/40 | (2006.01) |
| F02P 5/15 | (2006.01) |
| F16H 61/14 | (2006.01) |

(52) U.S. Cl.
CPC ......... *F02D 41/029* (2013.01); *B60W 10/026* (2013.01); *B60W 10/06* (2013.01); *B60W 10/08* (2013.01); *B60W 20/16* (2016.01); *F01N 3/023* (2013.01); *F02D 41/0002* (2013.01); *F02D 41/401* (2013.01); *F02P 5/1504* (2013.01); *F16H 61/14* (2013.01); *B60W 2510/0676* (2013.01); *F02D 2200/021* (2013.01)

(58) Field of Classification Search
CPC .. F02D 41/029; F02D 41/0002; F02D 41/401; F02D 2200/021; F02D 29/02; F02D 2200/023; F02D 41/0215; F02D 41/022; F02D 41/123; F02D 41/126; B60W 10/026; B60W 10/06; B60W 10/08; B60W 20/16; B60W 2510/0676; F01N 3/023; F02P 5/1504; F16H 61/14; F16H 61/143
See application file for complete search history.

(56) References Cited

U.S. PATENT DOCUMENTS

| | | | |
|---|---|---|---|
| 2015/0260119 A1* | 9/2015 | Nishizawa | F02D 41/405 60/285 |
| 2021/0107448 A1* | 4/2021 | Nose | B60K 13/04 |
| 2024/0309825 A1* | 9/2024 | Toyama | F02D 41/1467 |

FOREIGN PATENT DOCUMENTS

JP     2021-099049 A     7/2021

* cited by examiner

*Primary Examiner* — Brandon D Lee
(74) *Attorney, Agent, or Firm* — SoraIP, Inc.

(57) ABSTRACT

An engine having a throttle valve, a filter for collecting an exhaust particulate matter from the engine, and a control device are provided, and the control device includes an acquisition unit for acquiring a temperature of the engine, a regeneration control unit for increasing an opening degree of the throttle valve as the temperature increases, and executing a regeneration control of the filter by a fuel cut. A vehicle comprising: a retard amount control unit that increases a retard amount of an ignition timing at a time of returning from the fuel cut as the temperature increases.

2 Claims, 4 Drawing Sheets

VEHICLE

CROSS-REFERENCE TO RELATED APPLICATION

This application claims priority to Japanese Patent Application No. 2022-176657 filed on Nov. 2, 2022, incorporated herein by reference in its entirety.

BACKGROUND

1. Technical Field

The present disclosure relates to a vehicle.

2. Description of Related Art

It is known to increase amount of air supplied to a filter by increasing a throttle opening so as to improve regeneration efficiency of the filter by fuel cut (see, for example, Japanese Unexamined Patent Application Publication No. 2021-099049 (JP 2021-099049 A)).

SUMMARY

However, when the amount of air is increased, output torque of the engine becomes too large at the time of returning from the fuel cut, which may cause a shock to the vehicle.

Therefore, an object of the present disclosure is to provide a vehicle in which a shock at the time of returning from fuel cut is suppressed while improving regeneration efficiency of a filter.

The above object can be achieved by a vehicle described below.

The vehicle includes: an engine including a throttle valve; a filter that collects an exhaust particulate matter from the engine; and a control device.

The control device includes an acquisition unit that acquires a temperature of the engine, a regeneration control unit that executes regeneration control of the filter through a fuel cut by increasing an opening degree of the throttle valve as the temperature increases, and a retard amount control unit that increases retard amount of an ignition timing at a time of returning from the fuel cut as the temperature increases.

The vehicle may include: a motor provided on a power transmission path between the engine and a drive wheel; and a torque converter including a lock-up clutch provided on the power transmission path between the motor and the drive wheel.

The regeneration control may include normal regeneration control for executing the fuel cut by engaging the lock-up clutch, and auxiliary regeneration control for assisting rotation of the engine by the motor while executing the fuel cut by disengaging the lock-up clutch, and the regeneration control unit may increase an opening degree of the throttle valve in the auxiliary regeneration control more than an opening degree of the throttle valve in the normal regeneration control.

The regeneration control unit may control an increase rate of an opening degree of the throttle valve with respect to the temperature to be larger in the normal regeneration control than in the auxiliary regeneration control.

According to the present disclosure, it is possible to provide a vehicle in which a shock at the time of returning from fuel cut is suppressed while improving regeneration efficiency of a filter.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Schematic Configuration of Hybrid Electric Vehicle

Figure 1:
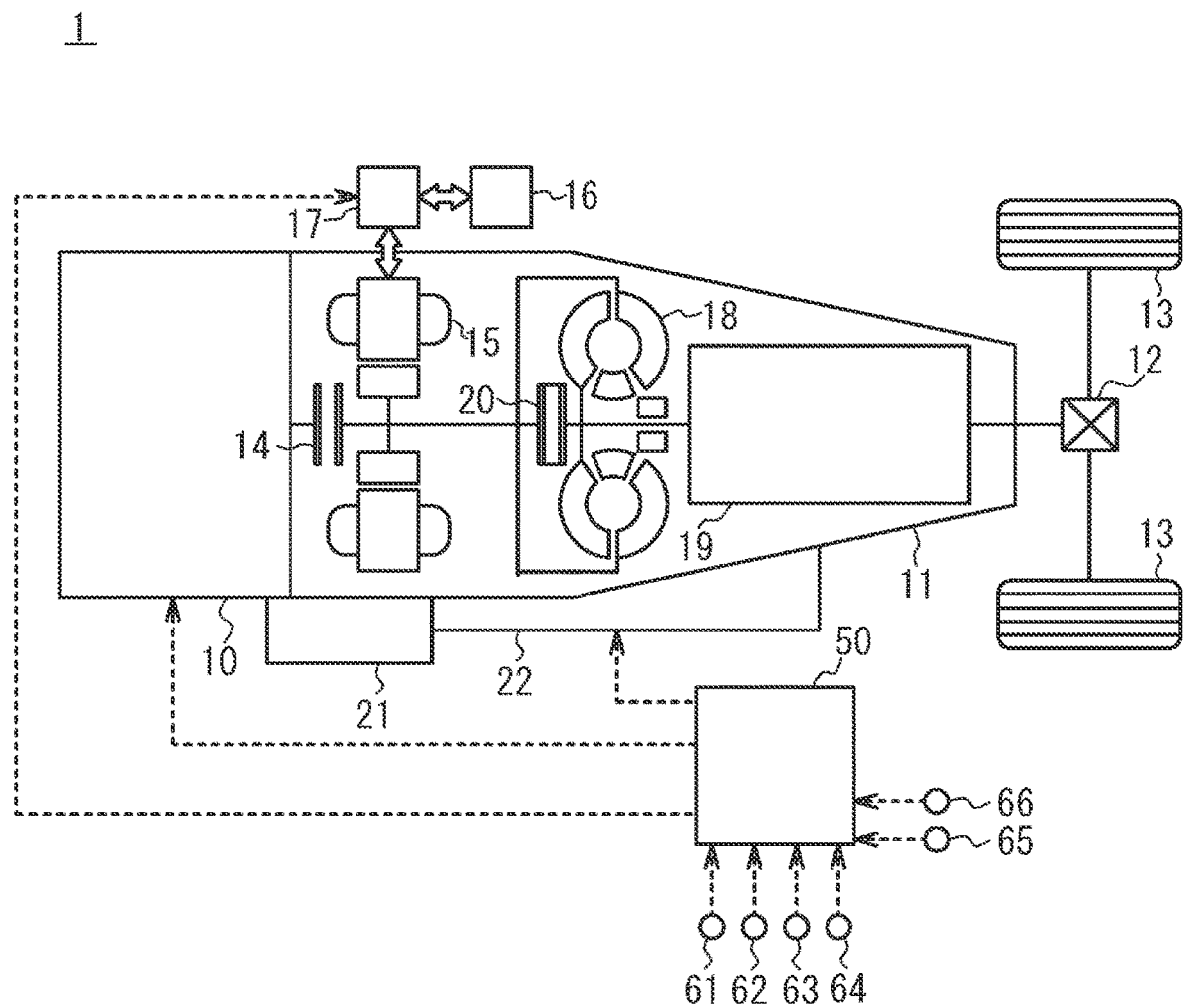
FIG. 1 is a schematic configuration diagram of a hybrid electric vehicle.

FIG. 1 is a schematic configuration diagram of a hybrid electric vehicle 1. Hybrid electric vehicle 1 is equipped with an engine 10 and a motor 15 as a driving power source. The engine 10 is a gasoline engine having a plurality of cylinders, but may be a diesel engine. A transmission unit 11 is provided on a power transmission path from the engine 10 to the drive wheels 13. The transmission unit 11 and the left and right drive wheels 13 are drivingly connected to each other via a differential 12.

The transmission unit 11 is provided with a K0 clutch 14 and a motor 15. The motor 15 is provided on a power transmission path from the engine 10 to the drive wheels 13. K0 clutch 14 is provided between the engine 10 and the motor 15 in the power transmission path. K0 clutch 14 is engaged by receiving the hydraulic pressure and connects the power transmission between the engine 10 and the motor 15. K0 clutch 14 is released in response to the stoppage of the hydraulic pressure supply and shuts off the power transmission between the engine 10 and the motor 15. In addition, K0 clutch 14 is slipped from the beginning of the torque-transmission until it is fully engaged.

The motor 15 is connected to the battery 16 via an inverter 17. The battery 16 is a rechargeable secondary battery such as a nickel-metal hydride battery or a lithium-ion battery. The motor 15 functions as a motor that generates a driving force of the vehicle in response to power supply from the battery 16. The motor 15 also functions as a generator that generates electric power to charge the battery 16 in response to power transmission from the engine 10 and the drive wheels 13. The electric power exchanged between the motor 15 and the battery 16 is adjusted by the inverter 17.

The transmission unit 11 is provided with a torque converter 18 and an automatic transmission 19. The torque converter 18 is a fluid coupling having a torque amplification function. The automatic transmission 19 is a stepped transmission in which the gear ratio is switched in multiple stages. The torque converter 18 is provided between the motor 15 and the drive wheels 13 on the power transmission path. The automatic transmission 19 is provided between the torque converter 18 and the drive wheels 13 on the power transmission path. The torque converter 18 is provided with a lock-up clutch (hereinafter referred to as a LU clutch) 20 which is engaged with the motor 15 by receiving the supply of the hydraulic pressure and directly connects the motor to the automatic transmission 19.

LU clutch 20 is engaged by receiving the hydraulic pressure and connects the power transmission between the motor 15 and the drive wheels 13. LU clutch 20 is released in response to the stoppage of the hydraulic pressure supplying. LU clutch 20 is also slipped from release to engagement.

The transmission unit 11 is further provided with an oil pump 21 and a hydraulic control mechanism 22. The hydraulic pressure generated by the oil pump 21 is supplied to K0 clutch 14, the torque converter 18, the automatic transmission 19, and LU clutch 20 via the hydraulic control mechanism 22. The hydraulic control mechanism 22 is provided with hydraulic circuits of K0 clutch 14, the torque converter 18, the automatic transmission 19, and LU clutch 20, and various hydraulic control valves for controlling the hydraulic pressures.

Hybrid electric vehicle 1 is provided with an Electronic Control Unit (ECU) 50 as a control device of the same hybrid electric vehicle. ECU 50 is an electronic control unit including an arithmetic processing unit that performs various arithmetic processing related to travel control of vehicles, and a memory that stores control programs and data. ECU 50 is an exemplary control device and functionally realizes an acquisition unit, a regeneration control unit, and a retard amount control unit, which will be described later in detail.

An ignition switch 61, a crank angle sensor 62, an air flow meter 63, air-fuel ratio sensors 64 and 65, and a water temperature sensor 66 are connected to ECU 50. The ignition switch 61 detects ON/OFF of the ignition. The crank angle sensor 62 detects the rotational speed of the crankshaft of the engine 10. The air flow meter 63 detects an amount of intake air introduced into the engine 10. The air-fuel ratio sensors 64 and 65 detect the air-fuel ratio of the exhaust gas of the engine 10. The water temperature sensor 66 detects the temperature of the coolant for cooling the engine 10.

ECU 50 controls driving of the engine 10 and the motor 15. Specifically, ECU 50 controls the inverter 17 to control the torque of the motor 15 by adjusting the amount of transfer of electric power between the motor 15 and the battery 16. ECU 50 controls driving of K0 clutch 14, LU clutch 20, and the automatic transmission 19 through control of the hydraulic control mechanism 22.

ECU 50 causes hybrid electric vehicle 1 to travel in either the motor running mode or the hybrid running mode. In the motor running mode, ECU 50 releases K0 clutch 14 to rotate the drive wheels 13 with the power of the motor 15. In the hybrid drive mode, ECU 50 engages K0 clutch 14 to rotate the drive wheels 13 with the power of at least one of the engine 10 and the motor 15. For example, when the required driving force for hybrid electric vehicle 1 is equal to or higher than the driving force threshold, the driving force is switched from the motor driving mode to the hybrid driving mode. Further, when the charge amount of the battery 16 becomes equal to or less than the power threshold value, the mode is switched from the motor running mode to the hybrid running mode.

Schematic Configuration of the Engine

Figure 2:
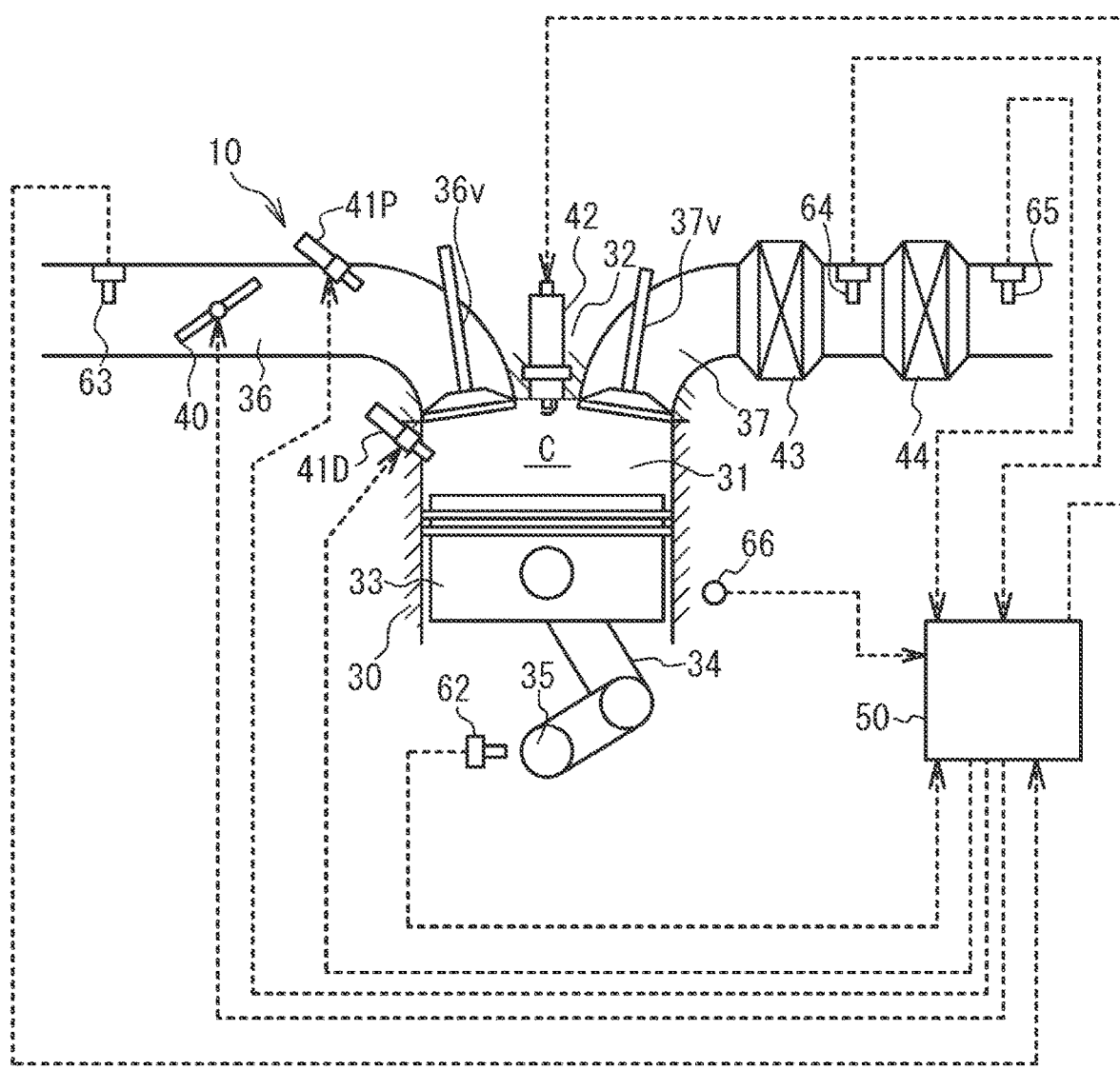
FIG. 2 is a schematic configuration diagram of an engine.

FIG. 2 is a schematic configuration diagram of the engine 10. The engine includes a cylinder block 30, a cylinder head 32, a piston 33, a connecting rod 34, a crankshaft 35, an intake passage 36, an intake valve 36v, an exhaust passage 37, and an exhaust valve 37v.

The cylinder block 30 is provided with a cylindrical bore 31. The piston 33 is reciprocally accommodated in the bore 31. The wall surface of the bore 31, the lower surface of the cylinder head 32, and the top surface of the piston 33 define the combustion chamber C. The volume of the combustion chamber C increases or decreases due to the reciprocation of the piston 33.

The crankshaft 35, which is an output shaft of the engine 10, is connected via a connecting rod 34. The connecting rod 34 and the crankshaft 35 convert the reciprocating motion of the piston 33 into the rotational motion of the crankshaft 35. The engine 10 is provided with the above-described crank angle sensor 62.

The intake passage 36 is connected to the combustion chamber C via an intake valve 36v. The exhaust passage 37 is connected to the combustion chamber C via an exhaust valve 37v. The air flow meter 63 described above is provided in the intake passage 36.

The cylinder block 30 is provided with an in-cylinder injection valve 41D for directly injecting fuel into the combustion chamber C. The intake passage 36 is provided with a port injection valve 41P for injecting fuel toward the intake port. The cylinder head 32 is provided with an ignition plug 42 for igniting the air-fuel mixture of the intake air and fuel introduced into the combustion chamber C. Note that only one of the in-cylinder injection valve 41D and the port-injection valve 41P may be provided.

A three-way catalyst 43 and a Gasoline Particulate Filter (GPF) 44 are provided in the exhaust passage 37. The three-way catalyst 43 contains a catalyst metal, has an oxygen-absorbing ability, and purifies NOx, HC and CO. GPF 44 is a porous ceramic structure, and collects exhaust particulate matters (hereinafter, referred to as Particulate Matter (PM) in exhaust gases. GPF 44 is an exemplary filter. For example, when the engine 10 is a diesel engine, a Diesel Particulate Filter (DPF) is provided instead of GPF 44.

An air-fuel ratio sensor 64 is provided between the three-way catalyst 43 and GPF 44. The air-fuel ratio sensor 64 detects the air-fuel ratio of the exhaust gas discharged from the three-way catalyst 43. An air-fuel ratio sensor 65 is provided downstream of GPF 44. The air-fuel ratio sensor 65 detects the air-fuel ratio of the exhaust gas discharged from GPF 44.

In ECU 50, the driving of the engine 10 is controlled by controlling the opening degree of the throttle valve 40, the fuel-injection quantity of the in-cylinder injection valve 41D and the port-injection valve 41P, the ignition timing of the ignition plug 42, and the like, based on the sensor-detected signal.

Regeneration Control

ECU 50 estimates GPF 44 deposition amount of PM, and requests regeneration control of GPF 44 when PM deposition amount becomes equal to or greater than a predetermined value. The method of estimating PM deposit may be estimated based on, for example, the driving history of the engine 10 from the completion of the previous regeneration control, the differential pressure before and after GPF 44, or the like, or may be estimated by any other known method. In the regeneration control, oxygen is supplied to GPF 44 to burn the deposited PM by performing fuel cut.

ECU 50 executes either the normal regeneration control or the auxiliary regeneration control as the regeneration control. The normal regeneration control is regeneration control in which fuel cut is performed while LU clutch 20 is engaged. When LU clutch 20 is engaged, the power is transmitted from the drive wheels 13 to the engine 10 even during the fuel cut operation, and a decrease in the rotational speed of the engine 10 is suppressed. As a result, GPF 44 can be reproduced while the engine 10 is prevented from stalling. The auxiliary regeneration control is a regeneration control in which fuel cut is performed while the motor 15 assists in rotating the engine 10 while LU clutch 20 is released. Since the motor 15 assists the engine 10 in rotating even when LU clutch 20 is released, the engine 10 can be prevented from stalling and the fuel cut period can be secured.

Which one of the normal regeneration control and the auxiliary regeneration control is to be executed is determined based on, for example, the temperature of the hydraulic oil. When the hydraulic fluid is at a low temperature below the predetermined temperature, LU clutches 20 may not be engaged. In such a case, auxiliary regeneration control is required. When the hydraulic oil is higher than the predetermined temperature, normal regeneration control is required.

Figure 3:
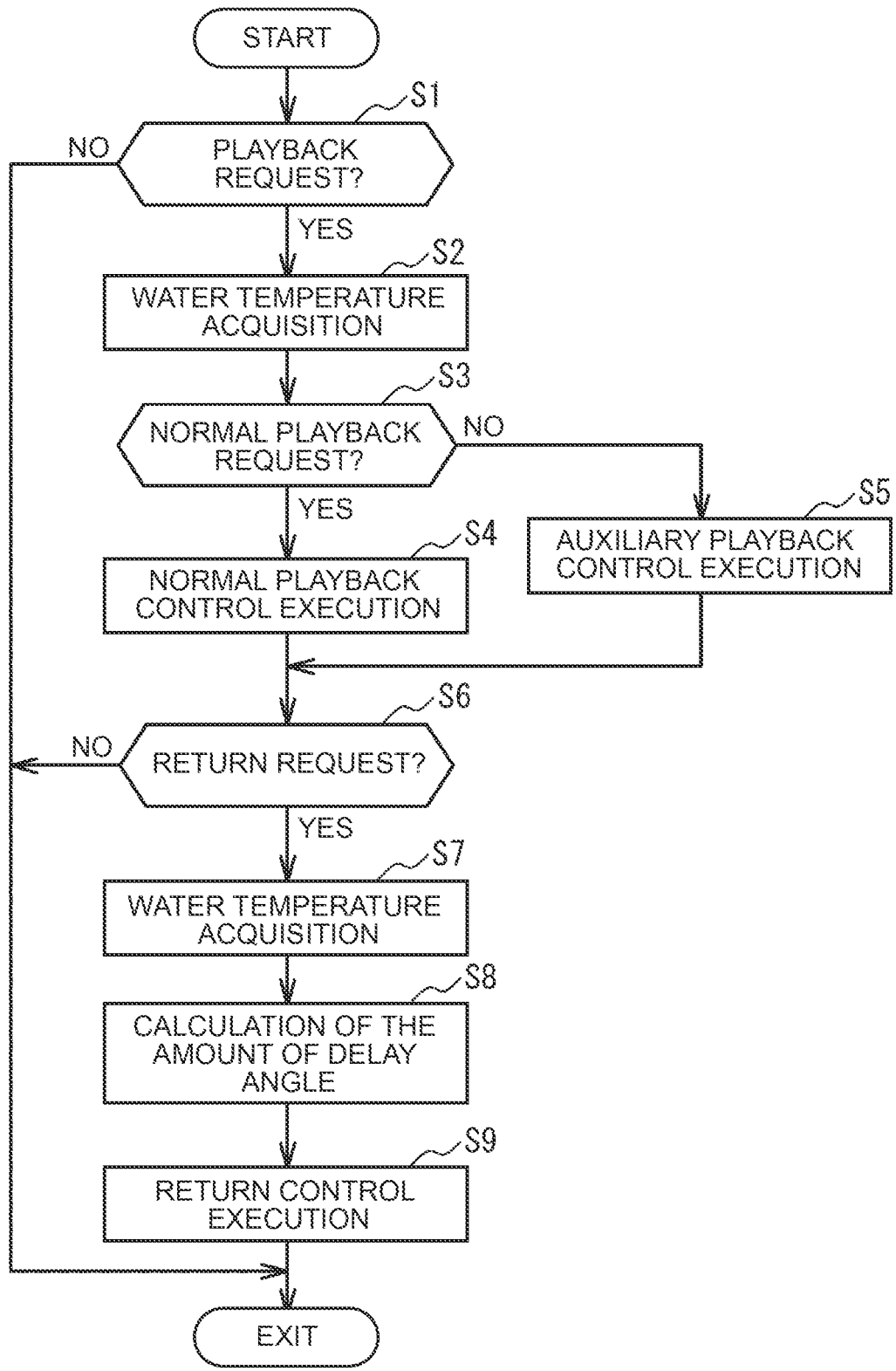
FIG. 3 is a flow chart illustrating GPF regeneration control.

FIG. 3 is a flow chart illustrating GPF regeneration control. This control is repeatedly executed while the ignition is on. ECU 50 determines whether or not there is a reproduction request (S1). If S1 is No, this control ends.

If S1 is Yes, ECU 50 obtains the water temperature (S2). Next, ECU 50 determines whether or not there is a normal reproduction request (S3). If S3 is Yes, ECU 50 performs normal regeneration control (S4). If S3 is No, ECU 50 performs auxiliary regeneration control (S5).

Figure 4A:
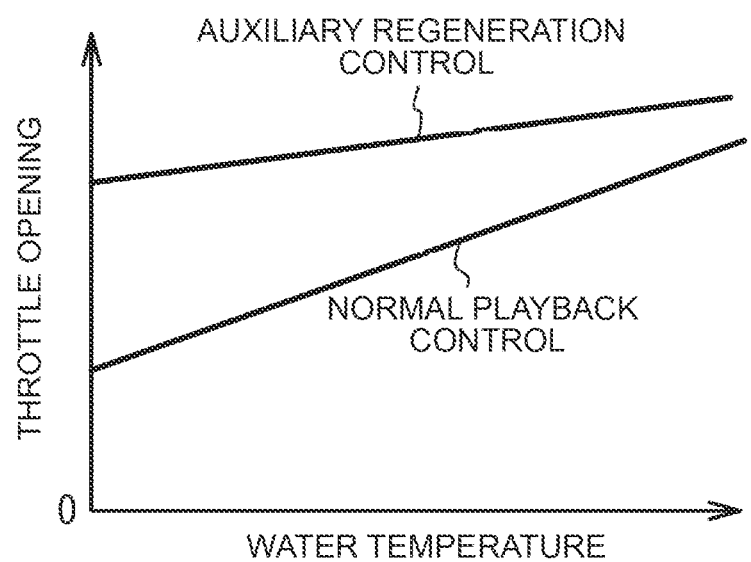
FIG. 4A is a map illustrating the throttle opening during the execution of the regeneration control by fuel cut.

FIG. 4A is a diagram illustrating an example of a throttle opening during the execution of regeneration control by fuel cut. The horizontal axis indicates water temperature. The vertical axis indicates the throttle opening degree. ECU 50 refers to the map in FIG. 4A and sets the throttle opening degree during the execution of the regeneration control based on the water temperature acquired by S2. In FIG. 4A, the throttle opening degree in each of the normal regeneration control and the auxiliary regeneration control is defined. As shown in FIG. 4A, the throttle opening degree in any of the cases is defined so as to increase as the water temperature increases. As will be described in detail later, the higher the water temperature, the larger the retardation amount of the ignition timing at the time of the fuel cut return, and thus it is possible to suppress the occurrence of a shock at the time of the fuel cut return.

In addition, when the water temperature is the same, the throttle opening degree is set to a value larger than that of the normal regeneration control in the auxiliary regeneration control. In the auxiliary regeneration control, since LU clutch 20 is in the released condition, the output torque of the engine 10 is less likely to be transmitted to the drive wheels 13 when the fuel cut is restored. This is because a shock at the time of returning to the fuel cut is unlikely to occur. Therefore, in the auxiliary regeneration control, the throttle opening degree is increased more than in the normal regeneration control, so that more oxygen can be supplied to GPF 44, and the regeneration efficiency is improved.

Further, the increase rate of the throttle opening degree with respect to the water temperature is larger in the normal regeneration control than in the auxiliary regeneration control. That is, the normal regeneration control has a larger influence on the throttle opening degree with respect to the water temperature than the auxiliary regeneration control. The higher the water temperature, the larger the retardation amount of the ignition timing at the time of the fuel cut-back, and thus the output torque of the engine 10 can be suppressed. In the auxiliary regeneration control, LU clutch 20 is released, so that it is unlikely to be shocked at the time of returning to the fuel cut state. This is because, in the normal regeneration control, since LU clutch 20 is engaged, the suppression of the shock due to the retard amount is large, and the throttle opening degree can be increased accordingly.

ECU 50 then S6 to determine if there is a need to recover from the fuel cut. If S6 is No, this control ends. If S6 is Yes, ECU 50 obtains the water temperature (S7).

Figure 4B:
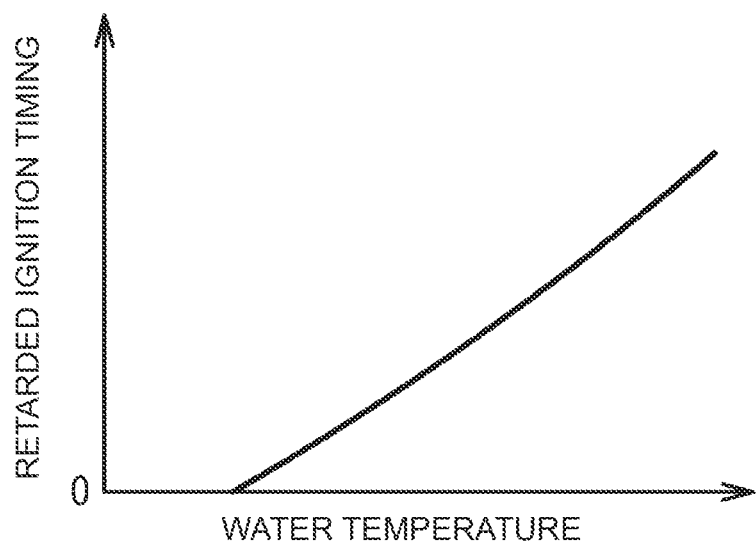
FIG. 4B is a map illustrating retardation amounts of ignition timings at the time of fuel cut recovery.

Next, ECU 50 calculates the retard amount of the ignition timing at the time of the fuel cut recovery based on the water temperature (S8). FIG. 4B is a map illustrating retardation amounts of ignition timings at the time of fuel cut recovery. The horizontal axis indicates water temperature. The vertical axis indicates the retardation amount of the ignition timing. ECU 50 refers to the map of FIG. 4B and sets the retard amount of the ignition timing at the time of the fuel cut recovery based on the water temperature acquired in S7. Since the output torque of the engine 10 can be reduced as the retard amount is larger, the occurrence of shock can be suppressed by increasing the retard amount at the time of returning to the fuel cut. However, when the water temperature is low, the combustion rate is slow, and therefore, if the retardation amount is too large, there is a risk of misfire. Therefore, in the map of FIG. 4B, the retard amount of the ignition timing is defined to be decreased as the water temperature is lower. When the water temperature drops to a predetermined temperature or lower, the retardation amount is set to zero.

ECU 50 then S9 a return control from the fuel cut. In the return control, the ignition timing is retarded from the basic ignition timing by the retard amount set by S8, and the fuel-injection is resumed. As described above, as the water temperature is higher, the throttle opening degree is increased to improve the regeneration efficiency of GPF 44, and as the water temperature is higher, the retardation amount of the ignition timing is increased to suppress the shock at the time of the fuel cut return.

In the above embodiment, the temperature of the coolant was used as the temperature of the engine 10. However, the present disclosure is not limited thereto, and the temperature of the hydraulic oil may be used. Although the above embodiment has been described with reference to a hybrid electric vehicle 1, the present disclosure may be applied to an engine vehicle in which only an engine is mounted as a driving power source.

Examples of the present disclosure have been described in detail above. However, the present disclosure is not limited to such specific embodiments. Various changes and modifications can be made within the scope of the gist of the present disclosure described in the claims.

What is claimed is:

1. A vehicle comprising:
an engine including a throttle valve;
a filter that collects an exhaust particulate matter from the engine;
a motor provided on a power transmission path between the engine and a drive wheel;
a torque converter including a lock-up clutch provided on the power transmission path between the motor and the drive wheel; and
a processor, wherein
the processor is configured to
acquire a temperature of the engine,
execute regeneration control of the filter through a fuel cut by increasing an opening degree of the throttle valve as the temperature increases, the regeneration control including (i) normal regeneration control for executing the fuel cut by engaging the lock-up clutch and (ii) auxiliary regeneration control for assisting rotation of the engine by the motor while executing the fuel cut by disengaging the lock-up clutch, increase a first opening degree of the throttle valve in the auxiliary regeneration control more than a second opening degree of the throttle valve in the normal regeneration control, and increase retard amount of an ignition timing at a time of returning from the fuel cut as the temperature increases.

2. The vehicle according to claim 1, wherein the processor controls an increase rate of an opening degree of the throttle valve with respect to the temperature to be larger in the normal regeneration control than in the auxiliary regeneration control.

* * * * *